United States Patent [19]

Yanagawa et al.

[11] Patent Number: 4,581,567

[45] Date of Patent: Apr. 8, 1986

[54] DEVICE FOR FEEDING MAGNETIC HEAD

[75] Inventors: Yoshihiko Yanagawa; Atutaka Morimoto, both of Saitama, Japan

[73] Assignee: Citizen Watch Co., Ltd., Tokyo, Japan

[21] Appl. No.: 479,892

[22] Filed: Mar. 29, 1983

[30] Foreign Application Priority Data

May 28, 1982 [JP] Japan ................................. 57-89739
Aug. 10, 1982 [JP] Japan ............................... 57-138963

[51] Int. Cl.$^4$ ............................................. H02P 8/00
[52] U.S. Cl. ................................. 318/696; 318/685; 360/75; 360/77
[58] Field of Search .................. 318/696, 685; 360/64, 360/75, 77, 78, 104, 109

[56] References Cited

U.S. PATENT DOCUMENTS 4,445,153  4/1984  Fujimoto et al. ..................... 360/77

Primary Examiner—William M. Shoop, Jr.
Assistant Examiner—Saul M. Bergmann
Attorney, Agent, or Firm—Bernard, Rothwell & Brown

[57] ABSTRACT

A device for feeding a magnetic head used in a magnetic disc apparatus, wherein phase currents of the pulse motor are controlled by sensing the signals that are produced in proportion to off-track quantity of the head or by receiving signals that results from an error contained in the reproduced signals, in order to bring the head to a proper position.

6 Claims, 11 Drawing Figures

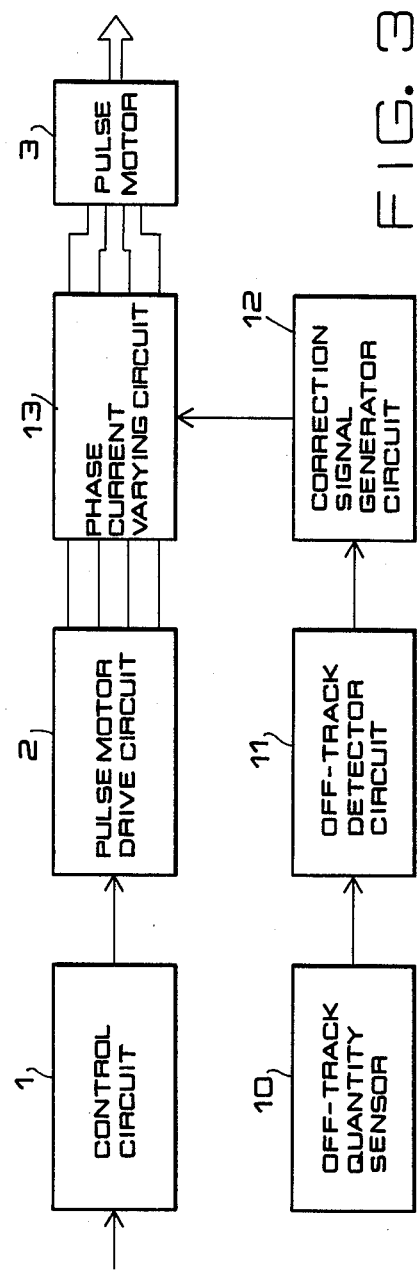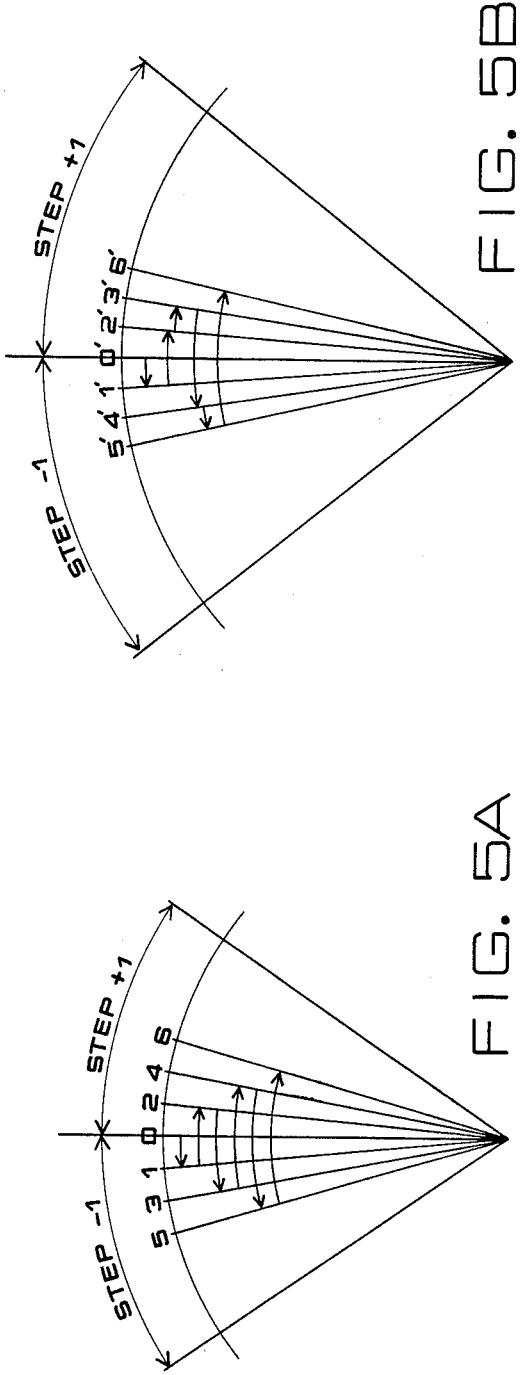

DEVICE FOR FEEDING MAGNETIC HEAD

BACKGROUND OF THE INVENTION

1. Field of the Invention

The present invention relates to a device for a feeding magnetic head, and more specifically to a device for feeding a magnetic head in a magnetic recording/reproducing apparatus employing a disc-like recording medium.

2. Description of the Prior Art

Conventional devices (positioners) for determining positions of the head employed in the magnetic recording/reproducing apparatus of this kind can be divided into those which determine the positions relying upon a closed loop system and those which determine the positions relying upon an open loop system.

A device relying upon the closed loop system consists of a linear motor which is energized by a servo circuit, a moving plate to which an end of a head-supporting spring is secured so that the head is permitted to move, and the like. Namely, this device is based upon a so-called data servo system in which a tracking position is recorded beforehand in the data-recording track on the disc, and when the data is to be reproduced, the signal is detected to so control the linear motor relying upon the control circuit that the head moves up to a predetermined position to reproduce the signals at an optimum position. There also exists a servo-surface servo system, according to which a special head is provided at a place (back surface of the disc is often used) which is different from the data track to record position signals (servo signals) only, and servo signals are reproduced and processed through a servo circuit to move the linear motor, such that the head interlocked thereto is moved to an optimum position.

With the closed loop servo systems employing linear motors, the head can be positioned maintaining increased precision, but increased manufacturing cost is required to realize a servo system which consists of servo circuits and linear motors.

According to a conventional device for positioning head based upon the open loop system, on the other hand, use is made of a pulse motor 3 as a drive source as shown in FIG. 1, and pulses are produced by a control circuit 1 in a number necessary for moving the head to a desired position. Currents are supplied to each of the phases of the pulse motor from a pulse motor drive circuit 2, or rotational direction of the pulse motor is changed, in order to turn the pulse motor in a required direction by a required amount. As the pulse motor 3 rotates, a belt 4 is wound around the central position of the shaft of the motor. Namely, the belt 4 of which the two ends are fastened to a moving plate is pulled toward either side depending upon the turn of the shaft, and one end of the moving plate 5 is pulled by the belt toward either side (toward the side of the disc or toward the opposite side), so that the head 6 on the disc 7 moves.

According to the open loop system in which position signals on the disc are not fed back to determine the position, the positioning precision is determined by the combination of precision in stop angle of the pulse motor, gap of the mechanism, dimensional change in the elements and parts caused by the temperature, and the like. Therefore, the open loop system has poorer positioning precision than the closed loop positioning system. Despite this fact, the open loop system has been widely used owing to its low manufacturing cost and compact size.

SUMMARY OF THE INVENTION

The principal object of the present invention is to provide a device for feeding a magnetic head, which is free from defects inherent in the above-mentioned open loop system.

Another object of the present invention is to provide a device for feeding a magnetic head which is simply constructed and which features greater positioning precision than the existing devices.

Further objects and advantages of the invention will become apparent from the detailed description of embodiments in conjunction with the accompanying drawings.

BRIEF DESCRIPTION OF THE DRAWINGS

FIG. 3 is a block diagram illustrating the setup according to an embodiment of the present invention;

FIGS. 5A and 5B are diagrams illustrating how to move the shaft of a pulse motor to correctly move the head onto the track according to another embodiment of the present invention;

DESCRIPTION OF THE PREFERRED EMBODIMENTS

Figure 1:
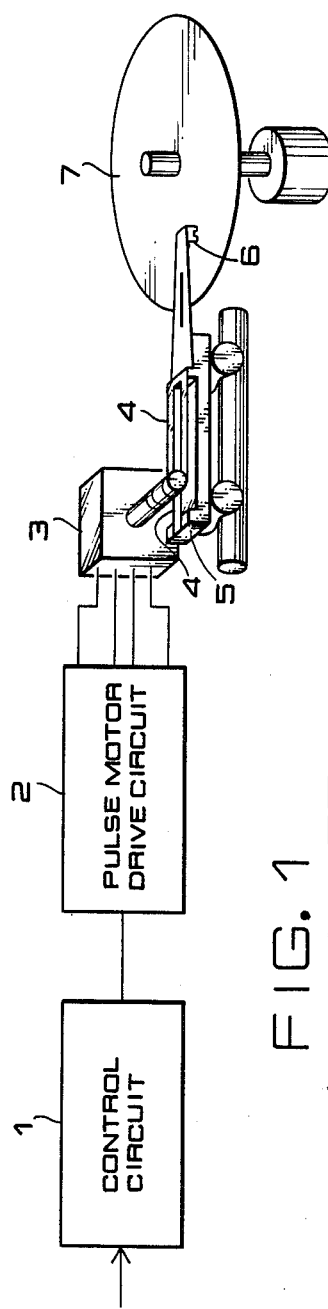
FIG. 1 is a diagram which illustrates the setup of a conventional device for feeding a magnetic head of the open loop system.
Figure 2:
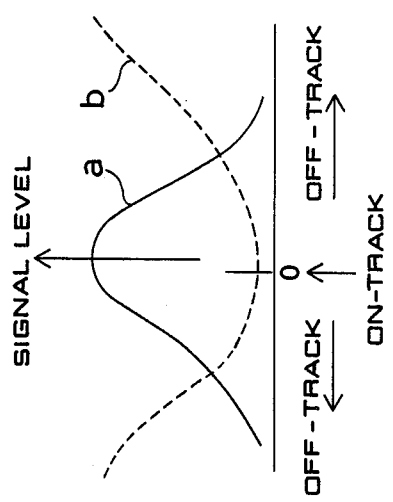
FIG. 2 is a diagram illustrating a relation between off-track quantity of a reproducing track and the level of reproduced signals.

FIG. 3 is a block diagram which illustrates an embodiment of the present invention, in which the same reference numerals as those of FIG. 1 denote the same or corresponding portions.

Reference numeral 10 denotes an off-track quantity sensor which serves as a data reading head when it is used to detect as an off-track quantity the reduction of amplitude of data signals written on the track on the disc. When it is intended to correct the off-track quantity that results from the change in temperature, the off-track quantity sensor may be a temperature sensor which is installed in the device. Or, any other sensor may be provided if it detects a quantity which is correlated to the off-track quantity.

Upon receipt of a signal from the off-track quantity sensor 10, an off-track detector circuit 11 discriminates whether the head is off-track, or whether the head position needs be corrected, and sends an output signal to a correction signal generator circuit 12.

The pulse motor 3 stops at a stable point at which the magnetic field established by currents flowing into coils of N phases (usually, two phases) of the stator is balanced with the magnetic field established by the rotor. Therefore, if one of the phase currents of the stator is changed by a small amount, the stable point changes so that the stop position of the pulse motor changes by a small amount.

Usually, the quantity in which two phase currents are out of balanced state is proportional to the stop angle between steps of the pulse motor. Therefore, either one of the two phase currents should be varied so that phase currents of the pulse motor are unbalanced by a quantity by which the head position should be corrected.

The signal which determines the unbalancing quantity is a correction signal.

A phase current varying circuit 13 continuously varies the current supplied to the pulse motor, and controls the phase currents responsive to signals from the correction signal generator circuit 12.

The system arrayed subsequent to the pulse motor is the same as that of FIG. 1. Embodiment of the invention will be described below concretely. To find an optimum position of the head relying upon data signals reproduced through the magnetic head, position of the head is, first, determined by the open drive method (open loop system) using an ordinary pulse motor, and the head position is moved by small amounts by finely changing the phase currents of the pulse motor in the back and forth directions with the above-determined head position as a reference. Amplitudes of signals read by the head are detected by a peak detector circuit, and their levels are stored. Among them, the position at which the greatest amplitude of reproduced signal is obtained is regarded to be a proper head position for reproduction, and the correction is so effected that the head will finally move to that position.

Figure 4:
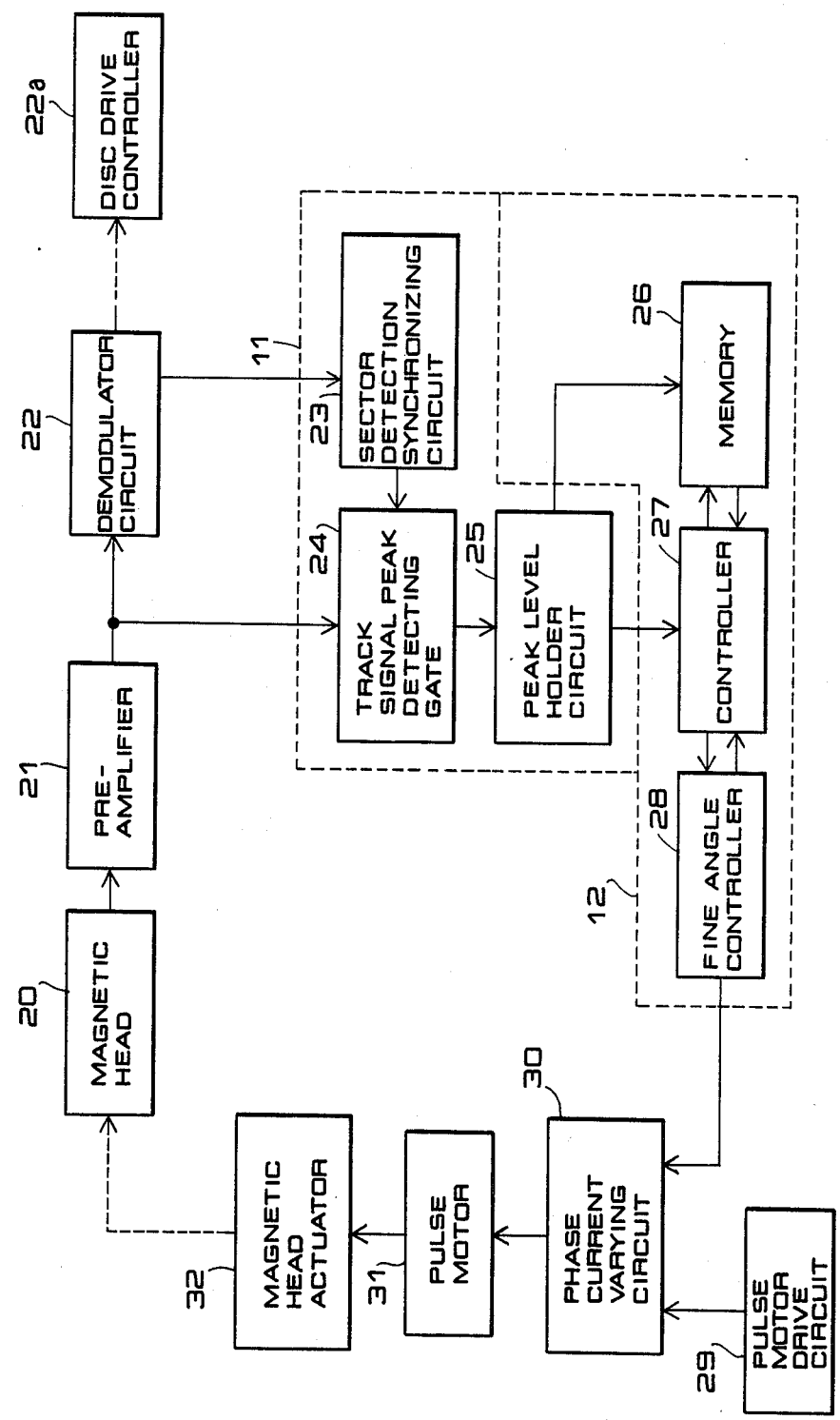
FIG. 4 is a block diagram which illustrates in detail the setup of FIG. 3.

This embodiment is concretely illustrated in FIG. 4. Namely, the device comprises a conventional signal reproducing system consisting of a magnetic head 20, preamplifier 21, demodulator circuit 22, and a disc drive controller 22a, as well as a sector detection synchronizing circuit 23, a gate 24 for detecting a peak value in the track signals, a peak level holder circuit 25, a memory 26 for storing peak levels of phase current pairs, and a head-feeding system which consists of a magnetic head feeding actuator 32, a pulse motor 31, and a pulse motor drive circuit 29, as well as a controller 27 which compares the levels and generates correction signals, a fine angle controller 28, and a phase current varying circuit 30.

First, the magnetic head 20 moved by the pulse motor up to a predetermined position reproduces signals from the disc at that position. The reproduced signals are amplified to a predetermined magnitude through the preamplifier, processed through the demodulator circuit 22 and subsequent circuits, and are exchanged relative to a host computer. According to the present invention, the head, in this case, is finely adjusted to an optimum position.

First, amplitude of the reproduced signals which have passed through the preamplifier 21 must be detected. However, a variety of signals have been written on the track; different data have different frequencies, and reproduced signals have different amplitudes. Therefore, unconditional detection of amplitudes (peaks) makes it quite difficult to determine whether it is the change in the peak level resulting from the off-track quantity or it is the change in the amplitude resulting from different data that are written on the track. That is, detection of off-track quantity lacks reliability. Accordingly, the following method should be employed. Usually, the track on a disc has several equally divided data blocks which are called sectors, and the same signal (often called SYNC signal) is written on the head portion of each sector. Therefore, if peaks of these signals having the same frequency are detected, it is possible to reproduce the level which is proportional to the off-track quantity.

Thus, timing signals contained in the sector signals are detected by the sector detection synchronizing circuit 23, signals in the head portions of the sectors are detected by a gate 24 for detecting peak of the track signals, and the peak level is held by the peak level holder circuit 25. Phase currents of the pulse motor are changed little by little by the fine angle controller 28, and signals in the head portion of the sectors are stored in the memory 26. This operation is repeated several times, and a position where the greatest peak level is obtained among them is found by the controller which compares the levels and which generates correction signals. Then, a signal which forms such phase currents that the greatest amplitude is obtained in the reproduced signals, is supplied from the fine angle controller 28 to a phase current varying circuit 30, in order to move the head to that position.

It has also been known that a large off-track quantity results from the change in temperature. Therefore, another embodiment consists of experimentally finding beforehand to which side the head will deviate from the track and by what amount depending upon the change in temperature, estimating the off-track quantity relative to a value of the temperature sensor installed on a suitable place, and generating a correction signal relying upon the estimated quantity thereby to correct the stop position of the pulse motor.

Another embodiment of this invention will be described. FIG. 5 illustrates how to move the shaft of the pulse motor in order to correctly bring the head located at a deviated position onto the track in accordance with the present invention.

Figure 6:
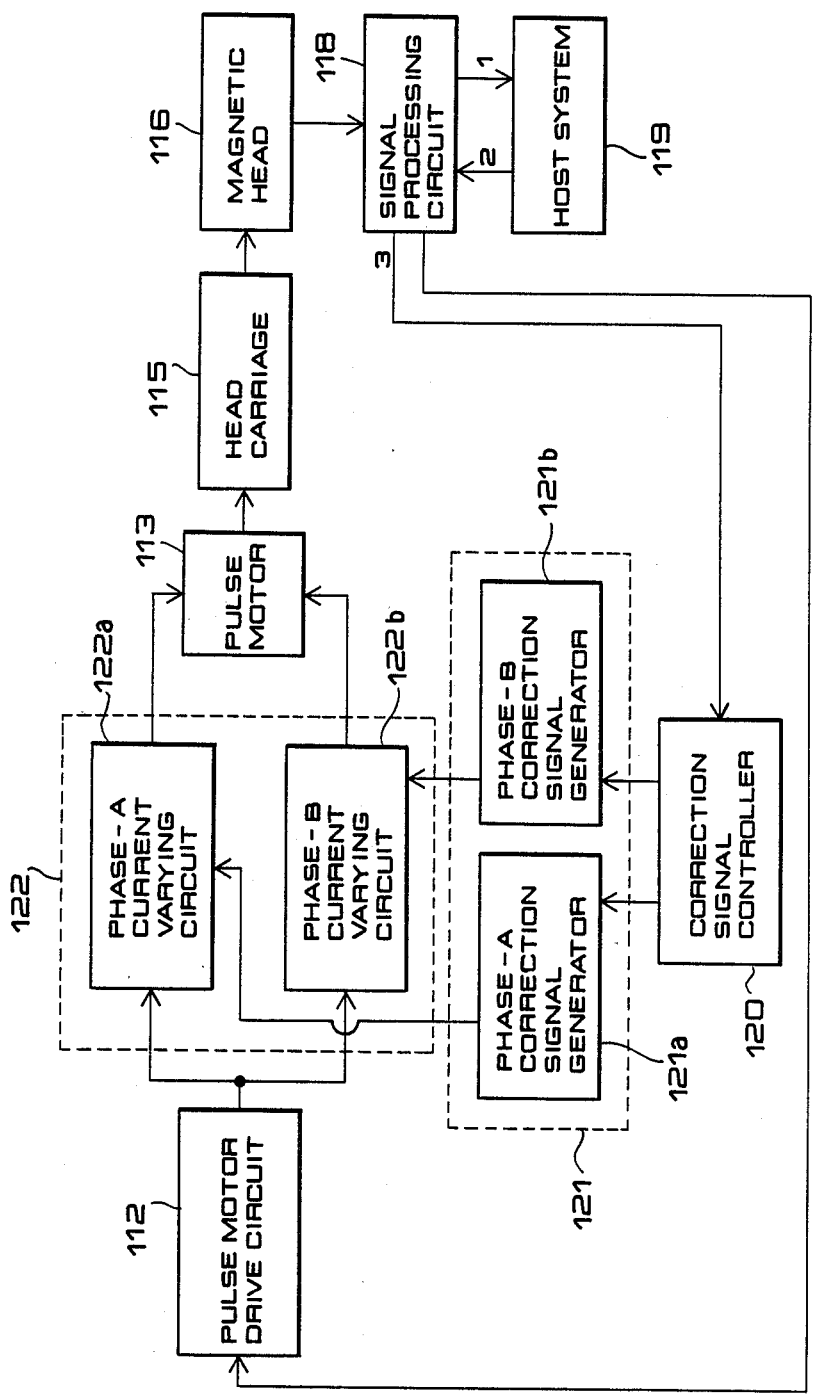
FIG. 6 is a block diagram which concretely illustrates the driving method of FIG. 5.

FIG. 6 is a block diagram which illustrates a concrete method for realizing the movement of FIG. 5.

In a conventional head-positioning method based upon the open loop system, let it be assumed that the motor is rotated by one step (distance of one track) and stops at a position 0 in FIG. 5. Here, however, the stop position may be a little different from the track position on which the data have been written, because of the reasons mentioned in the foregoing. The data therefore must be reproduced at this deviated position. When the head is deviated by a relatively large amount, therefore, the level of reproduction decreases, and signals of a neighboring track are often reproduced, making it difficult to correctly read the signals.

According to the present invention, phase currents of the pulse motor are slightly changed to move the motor shaft from the position 0 to, for example, the position 1 in FIG. 5; the data on the disc is read again at this position. When an error is still contained in the reproduced signals, the motor shaft is moved to a position 2 to read the data. When the error is still contained, the motor shaft is moved to a position 3, to a position 4, ——each by a predetermined amount to gradually increase the stop angle. That is, the shaft of the pulse motor is so moved that the head moves back and forth. In other words, phase currents of the pulse motor are changed little by little until the head moves to a position where signals on the track can be correctly read out.

FIG. 5A illustrates a method according to which the motor shaft is moved back and forth alternatingly by a predetermined amount with the initial stop position 0 as a reference. FIG. 5B illustrates an improved method according to which the motor shaft is moved with a position 0' as a reference. In this case, however, the motor shaft is once moved by a predetermined amount in one direction. When the signals are not properly read at that position, the motor shaft is further moved to a neighboring position in the same direction by a predetermined amount. When the signals are not still read properly, the motor shaft is then moved to the opposite side with the position 0' as a reference. This method helps generally reduce the time required for moving the motor shafts by small amounts, compared with the method of FIG. 5A.

The method for concretely realizing the above-mentioned idea will be explained below with reference to FIG. 6. The device of FIG. 6 is made up of a conventional head-positioning device of the open loop type consisting of a pulse motor drive circuit 112, a pulse motor 113, a head carriage 115, a magnetic head 116, and a signal processing circuit 118 which is composed of an amplifier, a circuit for processing reproduced signals and a disc drive circuit, further combined with a correction signal controller 120, a correction signal generator circuit 121, and a phase current varying circuit 122.

Under ordinary condition, the pulse motor 113 is rotated by a predetermined angle by the change of phase currents supplied to the pulse motor drive circuit 112 until a desired track is reached, in accordance with instructions from the signal processing circuit 118, whereby the head carriage 115 moves such that the magnetic head 116 moves and stops at a desired position on the magnetic disc.

As the positioning operation of the magnetic head 116 is completed, signals on the disc are read by the magnetic head 116, processed by the signal processing circuit 118, and are sent to a host system (host computer) 119 which checks at all times whether there is any error in an ID (indication field) or in the data field in the signals which are received. When there is any error, the host system 119 sends back to the signal processing circuit 118 a request for reading the signals again or a signal which indicates the presence of the error.

Upon receipt of the request for reading the signals again or the error signal, the signal processing circuit 118 immediately sends the request or the signal to the correction signal controller 120.

In this case, the correction signal controller 120 sends a signal to the correction signal generator circuit of either the phase-A side 121a or the phase-B side 121b in order to move the shaft of the pulse motor as illustrated in FIG. 5. Responsive to this signal, the correction signal generator circuit of the selected side produces a signal for reducing phase currents that are required for rotating the pulse motor by a predetermined small amount, and sends the signal to the phase current varying circuit 122a or to the phase current varying circuit 122b. The phase current varying circuit 122 varies the phase currents according to a correction signal.

If one phase current changes between the two phase currents, a point at which the rotor of the motor stops stably changes, and stop position of the motor shaft changes. In proportion to this movement, the head carriage 115 moves by a small amount, and the head moves by a predetermined amount to read signals at a position which is slightly deviated from the track from where the signals were read previously. The thus read signals are processed again by the signal processing circuit 118, and are sent to the host system 119. The above-mentioned operation is repeated until the data are correctly read. That is, position of the head is so corrected that the data that could not be correctly read are now read correctly. Presence of any error need not be discriminated by the host system but may be discriminated by a discrimination circuit which is provided in the signal processing circuit 118. Or, instead of checking any error in the data which are read, the head position may be corrected in case when the reproduced level of read signals is too small.

Concrete circuits for finely changing the phase currents of the motor are illustrated in FIGS. 7, 8, 9 and 10.

Figure 7:
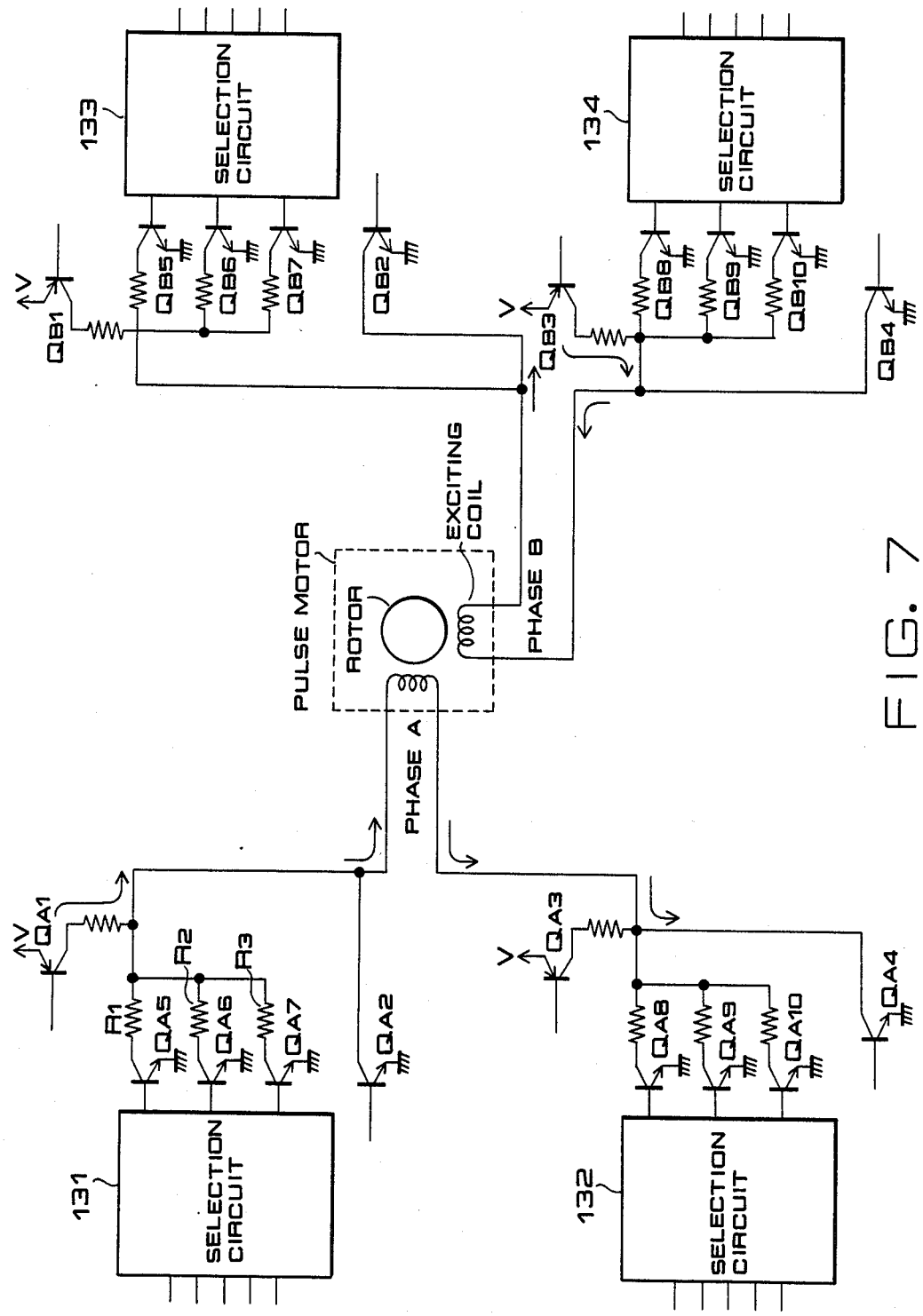
FIG. 7 is a circuit diagram which concretely illustrates the setup of FIG. 6.

FIG. 7 shows a circuit system in which shunt circuits having slightly different shunt currents are provided in parallel with phases of the motor, and are selected in such an order that the shunt current gradually increases, in order to reduce phase currents of the motor little by little.

In FIG. 7, four transistors $Q_{A1}$ to $Q_{A4}$ and four transistors $Q_{B1}$ to $Q_{B4}$, which are connected in the form of a bridge, work as switching transistors for driving the pulse motor in a bipolar fashion. Table 1 shows operation conditions of the transistors for stepwisely turning the shaft of the pulse motor in an ordinary manner.

TABLE 1

| State | $Q_{A1}$ | $Q_{A2}$ | $Q_{A3}$ | $Q_{A4}$ | $Q_{B1}$ | $Q_{B2}$ | $Q_{B3}$ | $Q_{B4}$ |
|---|---|---|---|---|---|---|---|---|
| → 1 | ON | OFF | OFF | ON | OFF | ON | ON | OFF |
| ↑ 2 | ON | OFF | OFF | ON | ON | OFF | OFF | ON |
| ↑ 3 | OFF | ON | ON | OFF | ON | OFF | OFF | ON |
| ← 4 | OFF | ON | ON | OFF | OFF | ON | ON | OFF |

To rotate the pulse motor in the clockwise direction, the state of Table 1 should be changed in the order of ①→②→③→④→①→②-----. To rotate the pulse motor in the counterclockwise direction, the state of Table 1 should be changed in the order of ①→④→③→②→①→④-----.

To realize the present invention, provision is made of transistors $Q_{A5}$ to $Q_{A10}$ and $Q_{B5}$ to $Q_{B10}$ for selecting shunt phase currents, and selection circuits 131, 132, 133 and 134 for selecting shunt transistors. Transistor selection circuits 131 to 134, in practice, can be realized by an IO port circuit of a decoder circuit or a microprocessor.

Figure 8:
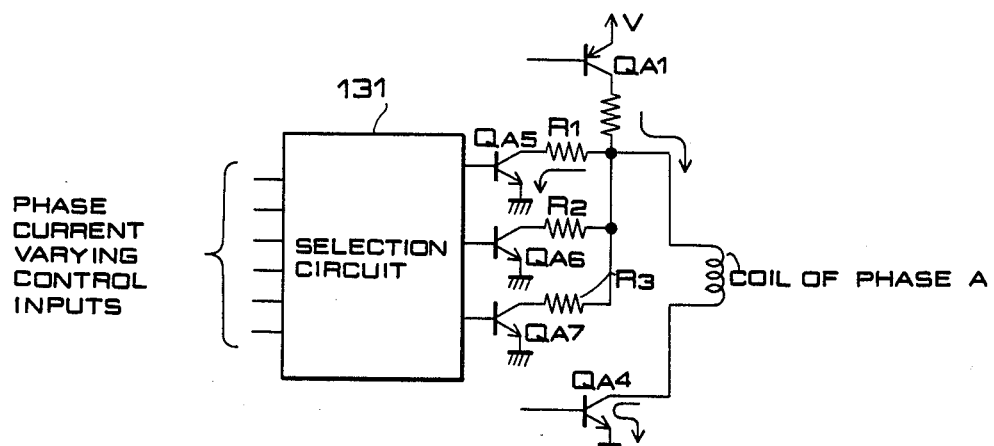
FIGS. 8 to 10 are circuit diagrams which concretely illustrate the embodiment when only one phase of the pulse motor is driven.

Below is mentioned, with reference to FIG. 8, a method of finely changing the phase currents to correct the head position in conjunction with a circuit which permits the current to flow to the coil of one phase only of the motor in FIG. 7.

The electric current usually flows from the power source to the motor coil through the transistor $Q_{A1}$ and flows into ground GND through the transistor $Q_{A4}$. To change the current of the phase A to eliminate an error contained in the data read on a given track, portion of the current supplied from the power source should be shunted before it flows into the coil. For this purpose, any one of the transistors $Q_{A5}$, $Q_{A6}$ and $Q_{A7}$ should be rendered conductive. If resistors connected to the collectors are stepwisely selected so that a relation $R_1 > R_2 > R_3$ is established, a greater shunt current flows when $Q_{A6}$ is selected than when $Q_{A5}$ is selected, and a further greater shunt current flows when $Q_{A7}$ is selected than when $Q_{A6}$ is selected. Therefore, the phase current reduces correspondingly, and stop position of the motor is deviated from the initial stop position by a predetermined amount. Since the individual transistors perform pure switching operation, i.e., rendered purely conductive or purely nonconductive, the shunt current can be determined depending solely upon the resistance. Therefore, the shunt current can be determined maintaining a considerably high precision.

The transistors $Q_{45}$, $Q_{46}$ and $Q_{Q7}$ can be easily selected by decoding a binary code by a decoder depending upon a required amount of shunt current, and the correction signal controller can be easily realized by a microcomputer or the like.

Figure 9:
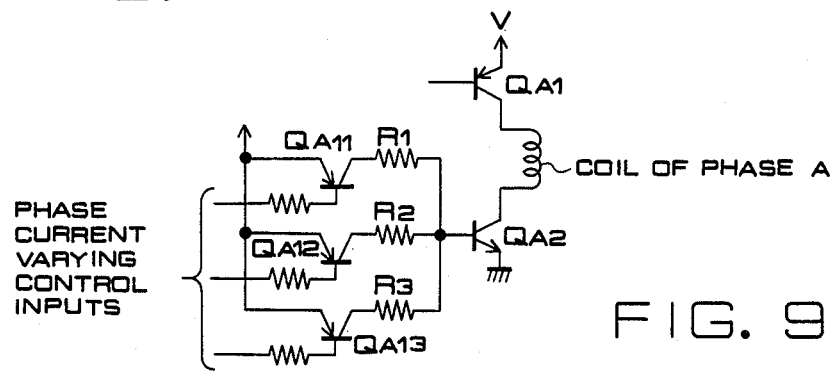
Figure 10:
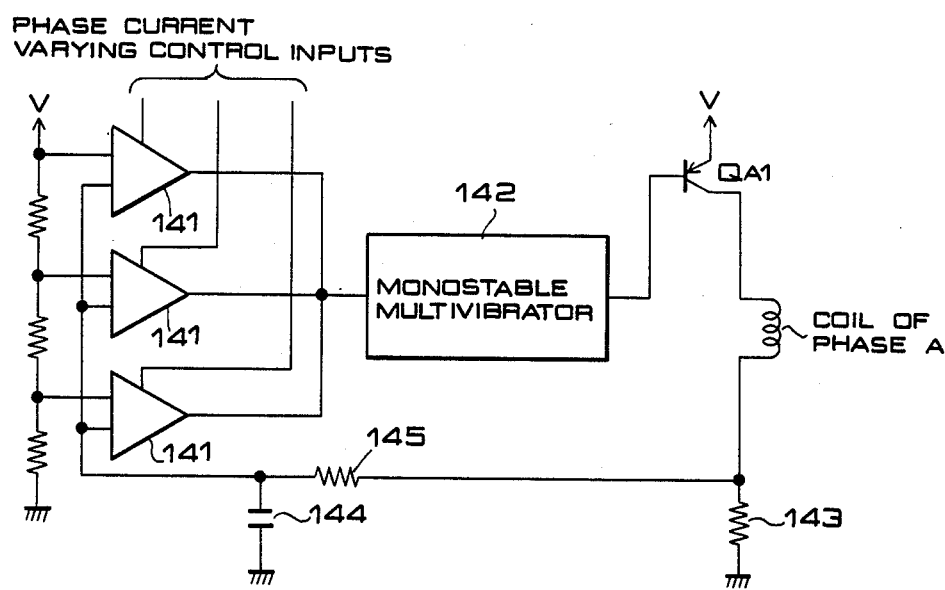

FIGS. 9 and 10 illustrate other embodiments for varying the phase current.

FIG. 9 illustrates a method of controlling the phase current by the transistor $Q_{42}$, in which $Q_{411}$, $Q_{412}$ and $Q_{413}$ denote transistors for switching bias currents, and $R_1$, $R_2$ and $R_3$ denote resistors for determining bias currents.

FIG. 10 illustrates a method which changes the time for flowing the phase current, wherein reference numeral 141 denotes comparator circuits which compare the integrated value of phase current with several setpoint voltages that serve as references, and 142 denotes a monostable multivibrator which cuts off the transistor $Q_{41}$ for a given period of time when the phase current flows for more than a predetermined period of time. Reference numeral 143 denotes a resistor for detecting the phase current, and a capacitor 144 and a resistor 145 form an integration circuit which converts the value detected by the resistor 143 into a voltage level.

According to the setup of the present invention as described above, it is possible to determine a head position so that the data can be correctly read without the need of constructing a sophisticated servo system.

What is claimed is:

1. A device for feeding a magnetic head comprising:
   (a) a pulse motor control circuit which generates drive pulses that are necessary for moving the magnetic head to a predetermined position, said control circuit having an output terminal;
   (b) a pulse motor drive circuit which is connected to said output terminal;
   (c) a phase current varying circuit which continuously changes the current supplied to the pulse motor responsive to signals produced by the pulse motor drive circuit;
   (d) an off-track detector circuit which discriminates whether said magnetic head is off-track, and which also discriminates whether the position of said head must be corrected; and
   (e) a correction signal generator circuit which corrects detection signals produced by the off-track detector circuit, and which sends the correction signals to the phase current varying circuit.

2. A device for feeding a magnetic head according to claim 1, and including a demodulator circuit and a preamplifier, and wherein said off-track detector circuit comprises a sector detection synchronizing circuit connected to said demodulator circuit and receiving output signals from said demodulator circuit, a gate for detecting peak values in the track signals, said gate receiving signals produced by the sector detection synchronizing circuit and signals produced by said preamplifier, and a peak level holder circuit which is connected between the gate for detecting peak values in the track signals and the correction signal generator circuit.

3. A device for feeding a magnetic head according to claim 1, wherein said correction signal generator circuit comprises a memory for storing a peak level in the phase current pairs and a controller for comparing the levels and for generating correction signals, said memory and said controller being connected to the output terminal of the off-track detector circuit and being arranged to exchange signals relative to each other, and a fine angle controller connected between said controller and the phase current varying circuit, and which exchanges signals with said controller.

4. A device for feeding a magnetic head according to claim 1, and including a temperature sensor, and wherein correction signals are generated relative to values of the temperature sensed by said temperature sensor for finely correcting the stop position of the pulse motor correspondingly.

5. A device for feeding a magnetic head for use in a magnetic recording/reproducing apparatus, said apparatus including a pulse motor and comprising:
   (a) a pulse motor drive circuit which generates drive signals to drive a pulse motor;
   (b) a phase current varying circuit which continuously changes the electric current supplied to the pulse motor responsive to drive signals from the pulse motor drive circuit, said phase current varying circuit including phase A and phase B;
   (c) detection means which drives the pulse motor to detect the data that is read after the magnetic head has been moved to a predetermined position;
   (d) a signal processing circuit which receives signals from said detection means, said signal processing circuit having an output terminal;
   (e) a correction signal controller which is connected to said output terminal of the signal processing circuit and which prepares varying signals that determine whether the current of phase A or the current of phase B should be varied and determine the amount of such variation in order to move the shaft of the pulse motor; and
   (f) a correction signal generator circuit which receives signals produced by the correction signal controller and which sends to said phase current varying circuit the signals to reduce phase currents, such that the shaft of the pulse motor is rotated by a desired small amount.

6. A device for feeding a magnetic head according to claim 5, wherein said phase current varying circuit includes shunt circuits that are connected in parallel with phases of the pulse motor so that the shunt quantity can be finely changed, and wherein the shunt circuits are so selected that the shunt quantity gradually increases, such that phase currents of the motor are correspondingly reduced.

* * * * *